(12) United States Patent
Leffler et al.

(10) Patent No.: US 11,975,868 B2
(45) Date of Patent: May 7, 2024

(54) SYSTEM AND METHOD OF MONITORING REDUCED PERFORMANCE

(71) Applicant: Bell Textron Inc., Fort Worth, TX (US)

(72) Inventors: Keith B Leffler, Arlington, TX (US); Guy Bernard, Kirkland (CA); Randy Aloysius, Baie D'Urfe (CA); Michael Logies, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 317 days.

(21) Appl. No.: 17/067,725

(22) Filed: Oct. 11, 2020

(65) Prior Publication Data

US 2022/0111977 A1    Apr. 14, 2022

(51) Int. Cl.
*B64F 5/60* (2017.01)
*G06F 30/20* (2020.01)
*G06F 113/28* (2020.01)

(52) U.S. Cl.
CPC .............. *B64F 5/60* (2017.01); *G06F 30/20* (2020.01); *G06F 2113/28* (2020.01)

(58) Field of Classification Search
CPC ......... B64F 5/60; G06F 30/20; G06F 2113/28
See application file for complete search history.

(56) References Cited

U.S. PATENT DOCUMENTS

| 2011/0112806 A1* | 5/2011 | Kisor | G01K 7/42 703/2 |
| 2020/0062416 A1* | 2/2020 | Mikic | G01P 5/00 |
| 2020/0333805 A1* | 10/2020 | English | B64C 13/0421 |

OTHER PUBLICATIONS

Hartmann P. Schütt M, Moormann D. Control of departure and approach maneuvers of tiltwing VTOL aircraft. InAIAA Guidance, Navigation, and Control Conference 2017 (p. 1914). (Year: 2017).*
Chang SJ, Kim NS. Estimation of displacement response from FBG strain sensors using empirical mode decomposition technique. Experimental mechanics. Jul. 2012;52:573-89. (Year: 2012).*

* cited by examiner

*Primary Examiner* — Chuen-Meei Gan
(74) *Attorney, Agent, or Firm* — Lightfoot & Alford PLLC

(57) ABSTRACT

A reduced performance monitoring system for a tiltrotor aircraft includes a physical component of the tiltrotor aircraft configured to displace over time in response to an input, a simulation component configured to generate a simulated displacement response of the physical component, and a comparison module configured to compare a measured physical displacement response of the physical component to the simulated displacement response of the physical component.

19 Claims, 5 Drawing Sheets

SYSTEM AND METHOD OF MONITORING REDUCED PERFORMANCE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Aircraft comprise systems and components that are intended to, in response to control commands, displace articulated surface effectors by predefined amounts in a predefined timeframe. When some aircraft systems and components are in the beginning stages of failure, movement of the systems and component may not adhere to the predefined timeframe or defined displacement. There exists a need for systems and methods of detecting inefficiencies and/or failures of such systems and components before a loss of function to proactively mitigate inefficiencies and activate redundant control channels so that reliable aircraft performance can be maintained.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
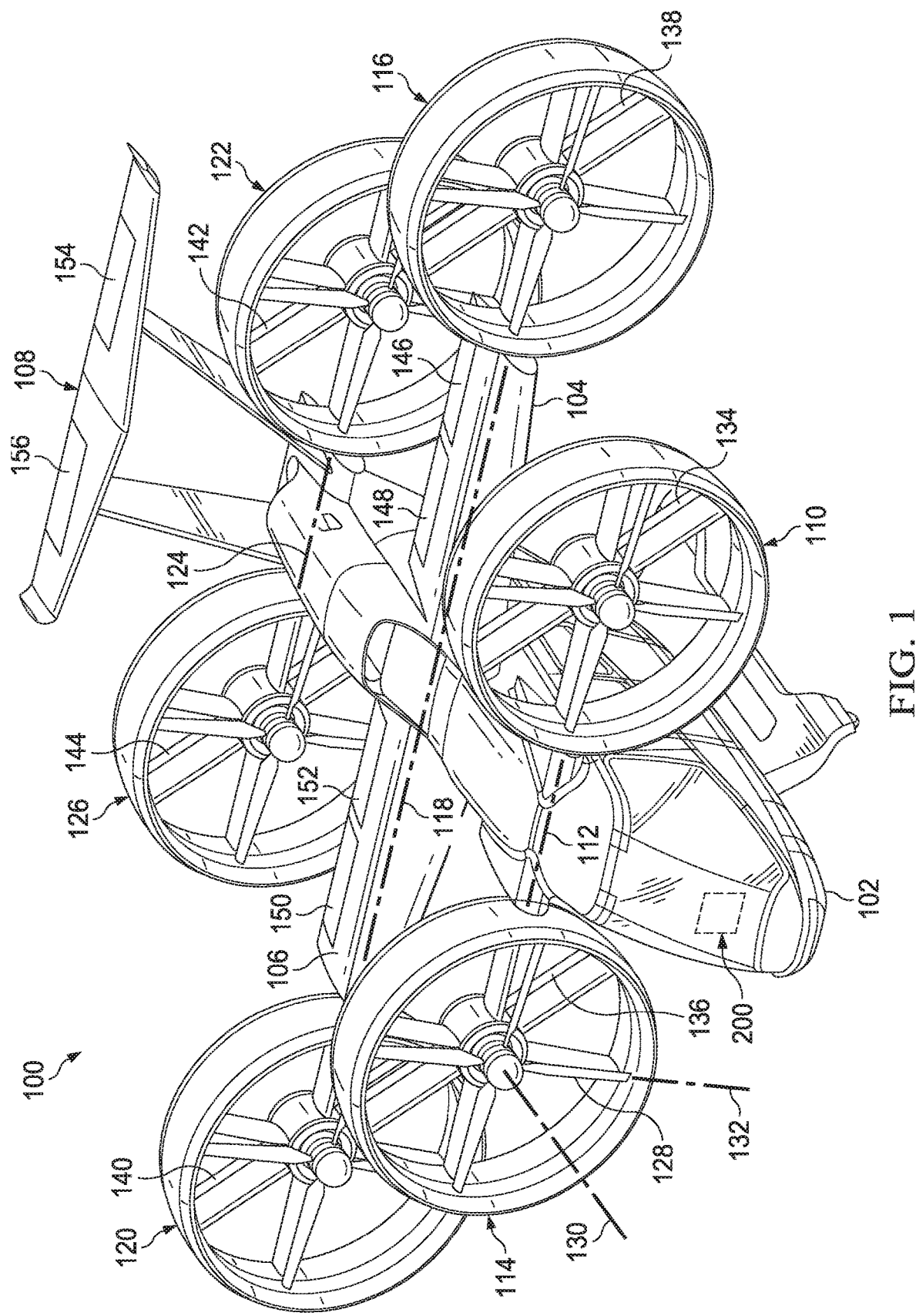
FIG. 1 is an oblique view of an aircraft in an airplane mode with movable surfaces in a streamline configuration.
Figure 2:
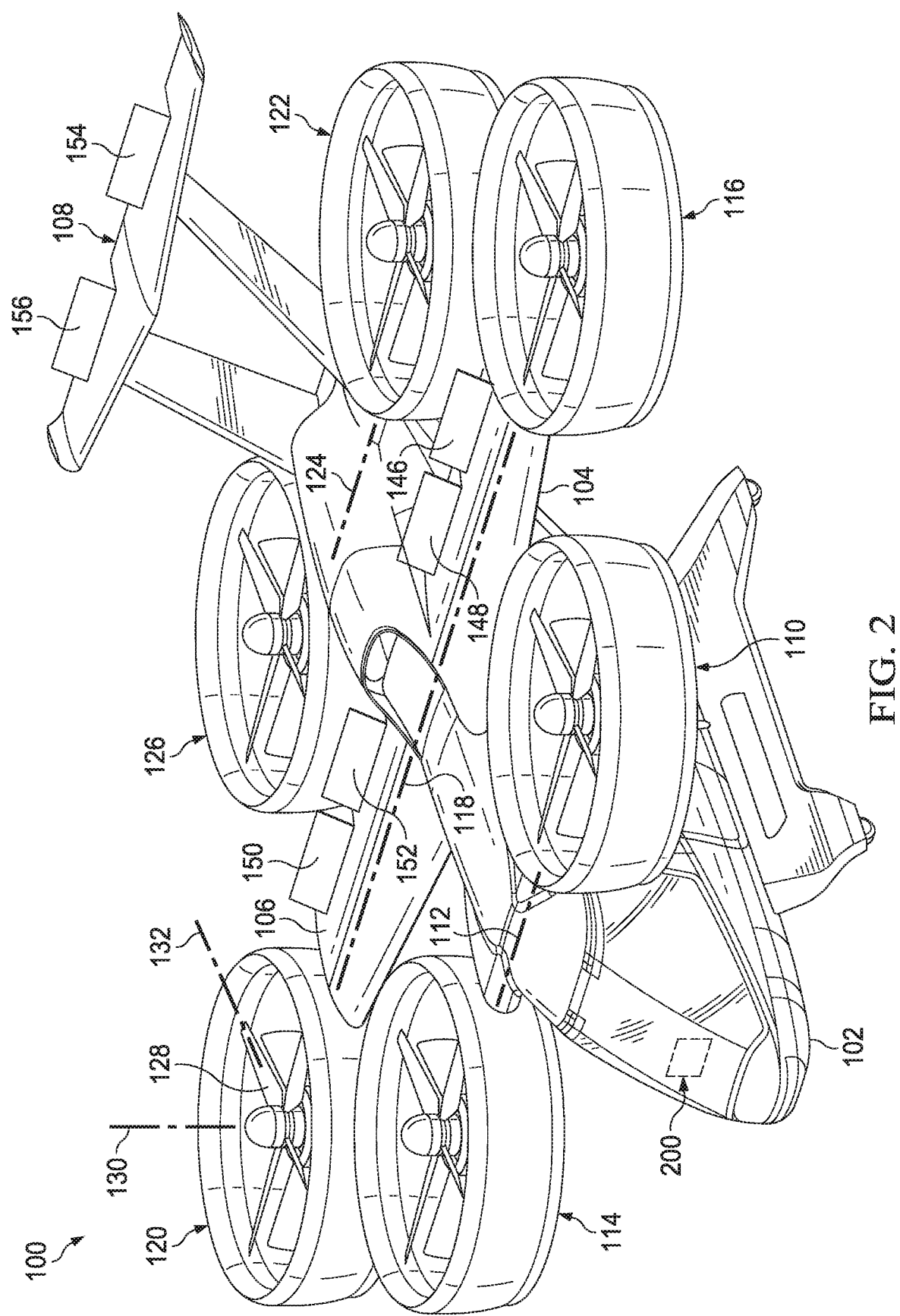
FIG. 2 is an oblique view of the aircraft of FIG. 1 in a hover mode with movable surfaces in a displaced configuration.

Referring now to FIGS. 1-2 an aircraft 100 according to this disclosure is shown. Aircraft 100 is generally configured as a vertical takeoff and landing (VTOL) aircraft that is operable in an airplane mode associated with forward flight and a helicopter mode associated with vertical takeoff from and landing to a landing zone. Aircraft 100 comprises a fuselage 102, a left wing 104, a right wing 106, and a tail 108. Aircraft 100 further comprises a front left ducted fan 110 located forward of the left wing 104 and rotatable about a front spindle axis 112, a front right ducted fan 114 located forward of the right wing 106 and rotatable about the front spindle axis 112, a left wing ducted fan 116 associated with the left wing 104 and rotatable about a wing spindle axis 118, a right wing ducted fan 120 associated with the right wing 106 and rotatable about the wing spindle axis 118, a rear left ducted fan 122 located rearward of the left wing 104 and rotatable about a rear spindle axis 124, and a rear right ducted fan 126 located rearward of the right wing 106 and rotatable about the rear spindle axis 124. Rotation of the ducted fans about the spindle axes allows movement of the ducted fans between the airplane mode configuration and the helicopter mode configuration. Each of the ducted fans comprises a plurality of rotor blades 128 that are rotatable about a rotor axis 130 and each of the rotor blades 128 can change pitch by rotating about a pitch axis 132.

Further, the front left ducted fan 110, front right ducted fan 114, left wing ducted fan 116, right wing ducted fan 120, rear left ducted fan 122, and rear right ducted fan 126 comprise vanes 134, 136, 138, 140, 142, and 144, respectively. Left wing 104 comprises a left outer elevator 146 and a left inner elevator 148. Right wing 106 comprises a right outer elevator 150 and a right inner elevator 152. Elevators 146, 148, 150, and 152 are independently controllable and can be moved from the streamline position shown in FIG. 1 to an upper maximum positive displacement position as shown in FIG. 2. The elevators can also be moved to a maximum negative displacement position that is not shown and to any position between the maximum positive displacement and the maximum negative displacement positions. Still further, aircraft 100 comprises a left tail flap 154 and a right tail flap 156. Tail flaps 154, 156 are independently controllable and can be moved from the streamline position shown in FIG. 1 to an upper maximum positive displacement position as shown in FIG. 2. Tail flaps 154, 156 can also be moved to a maximum negative displacement position that is not shown and to any position between the maximum positive displacement and the maximum negative displacement positions. Similarly, vanes 134, 136, 138, 140, 142, and 144 can be moved to maximum positive displacement positions and maximum negative displacement positions relative to a central streamline position and to positions therebetween.

In this embodiment, aircraft 100 is configured to operate in part by controlling a plurality of movement variables that can be monitored for reduced performance. Each movement variable can be associated with predetermined displacement (whether linear or angular), angular velocity (or rotations per minute), acceleration (rate of change of velocity), and any other measures of speed, acceleration, and/or jerk (rate of change of acceleration). More specifically, in this embodiment, the following movement variables are monitored for reduced performance: angular flap displacement, angular elevator displacement, angular spindle displacement, rotor blade displacement about rotor axis, rotor blade displacement about pitch change axis, and duct vane angular displacement. In some cases, the displacement is measured by sensors separate from the motivating drivers (motors, actuators, etc.) while in other cases, the motivating drivers can comprise integral measurement sensors or devices. Accordingly, the displacements can be measured, and velocities, accelerations, and jerks can be calculated for a period of time.

Figure 3:
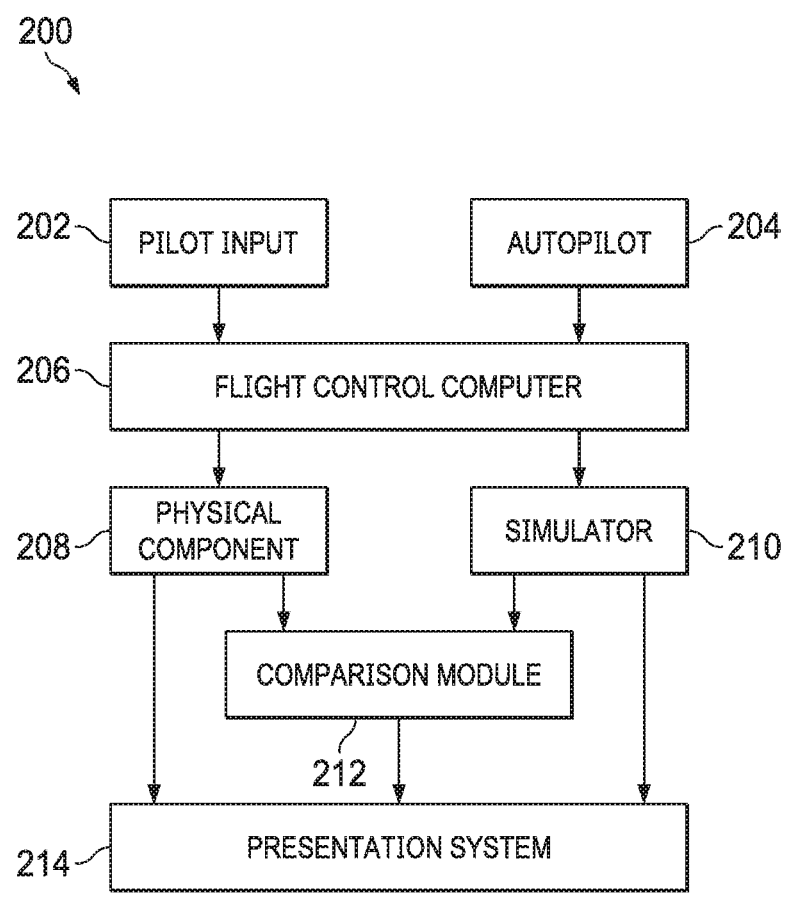
FIG. 3 is a schematic representation of information flow in a reduced performance monitoring system of the aircraft of FIG. 1.

Referring now to FIG. 3, a reduced performance monitoring system (RPMS) 200 of the aircraft 100 can comprise one or more commonly existing components and/or modules while additionally including components and/or modules unique to this disclosure. For example, RPMS 200 comprises devices 202 configured to receive pilot inputs, an autopilot system 204 configured to generate inputs to supplement or replace pilot inputs, a flight control computer 206 configured to receive the pilot and autopilot inputs, physical components 208 to receive instructions from the flight control computer (such as the motivating drivers of the above-described devices associated with the movement variables), a simulator 210 configured to model one or more of the physical components and output simulated movement of the one or more physical components based on the instructions from the flight control computer 206, a comparison module 212 configured to receive the simulated movement values from the simulator 210 as well as measured values of movement of the physical components and to compare the actual versus simulated movement values, and a presentation system 214 configured to receive the comparison results and take an action in response to the comparison results.

Figure 4:
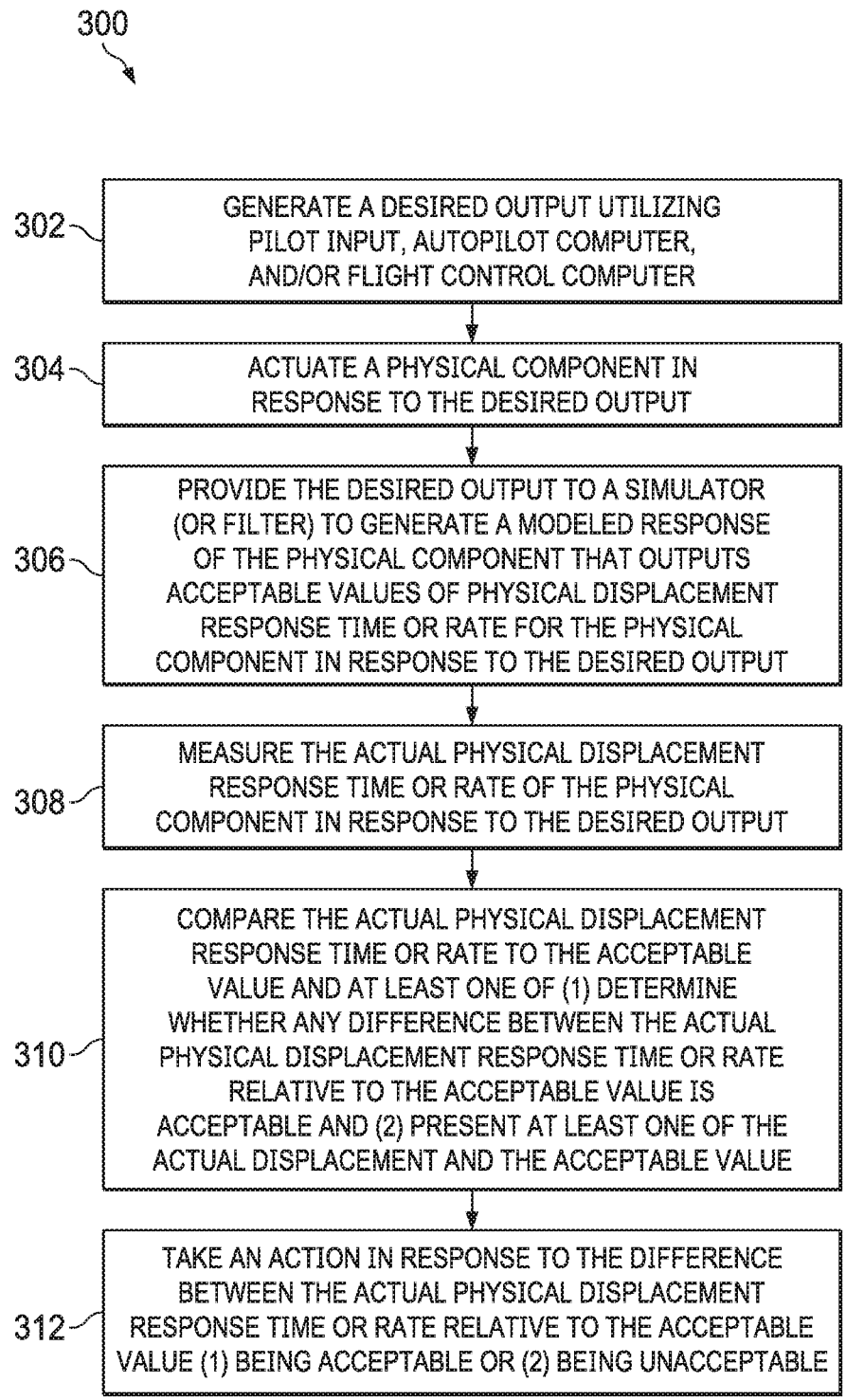
FIG. 4 is a flowchart of a method of operating the reduced performance monitoring system of FIG. 3.

Referring now to FIG. 4, the RPMS 200 may be controlled according to a method 300 of monitoring for reduced performance. The method 300 can begin at a first block 302 by generating a desired output utilizing pilot input, an autopilot computer, and/or the flight control computer. Next, the method 300 may at block 304 actuate a physical component in response to the desired output. Next, the method 300 may at block 306 provide the desired output to a simulator (or filter) to generate a modeled response of they physical component that outputs acceptable values of physical displacement and/or response time. Next, at block 308, the method 300 may measure the actual physical displacement and/or response time of the physical component. Next at block 310, the method 300 may compare the actual measured physical displacement or response time to either (1) determine whether any difference between the actual physical displacement response time or rate relative to the simulated (or modeled) value is acceptable (2) present at least one of the actual displacement and the simulated (or modeled) value. Further, at block 312 the method 300 may take an action in response to the difference between the actual measured physical displacement or response time being acceptable or unacceptable. For example, when the comparison determines that the actual displacement is too slow to begin movement (indicating a reduction in performance), a normal delay in commanding movement of the physical component may be shortened so that the physical component begins movement according to an acceptable timeframe. Similarly, when the actual displacement over a period in time is less than acceptable, a normal length of time of commanding a physical component may be lengthened so that the physical component ultimately reaches a desired displacement even if it takes longer than an acceptably performing physical component.

Figure 5:
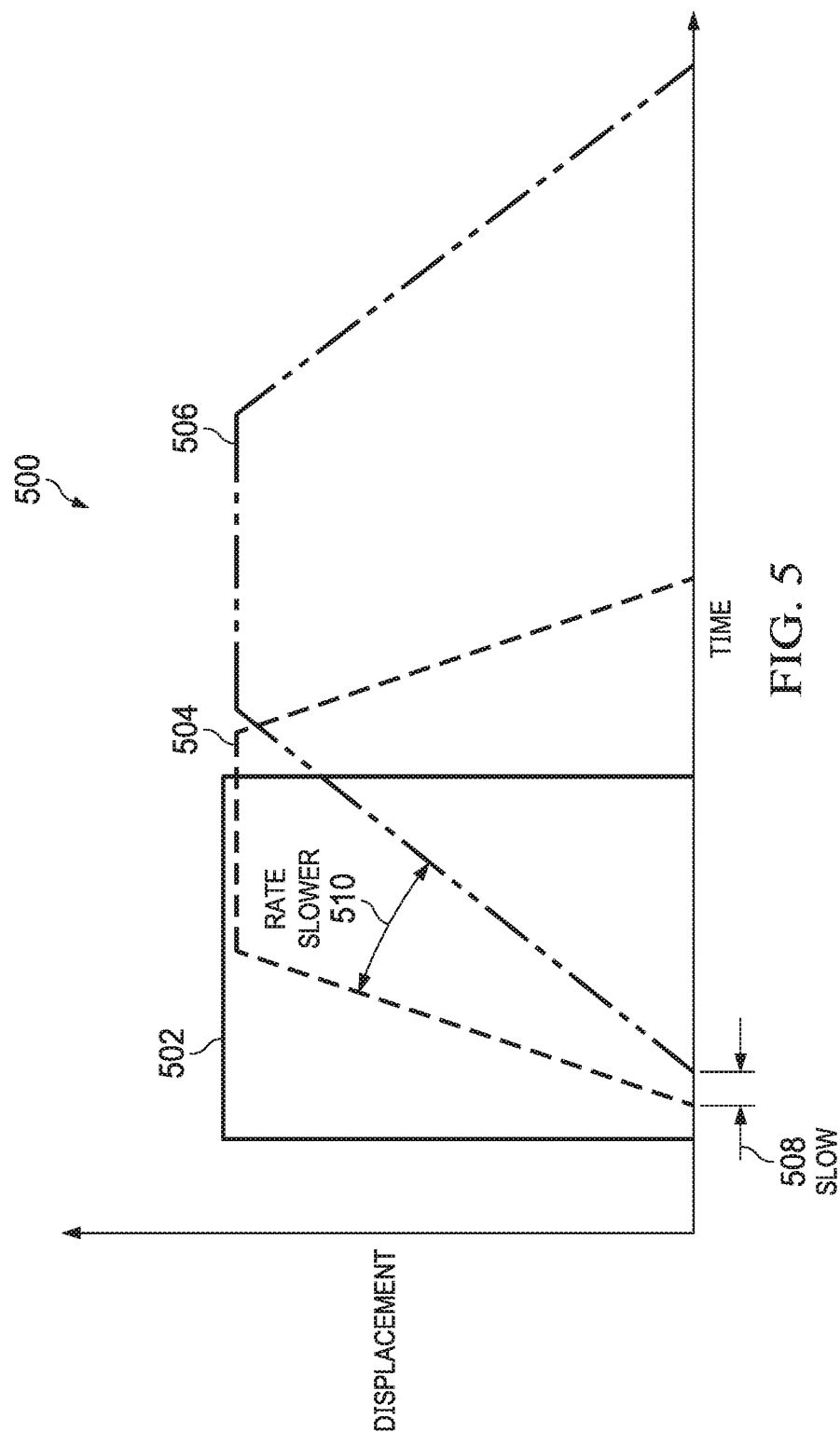
FIG. 5 is a graph comparing ideal, predicted, and actual performance of a movable surface of the aircraft of FIG. 1.

Referring now to FIG. 5, a solid line represents an ideal displacement response 502 of a physical component over time, a dotted line represents a modeled or simulated acceptable displacement response 504 of the physical component, and a dashed line represents an actual measured displacement response 506 of the physical component. As can be seen, while the model response expectedly begins displacement after the ideal response and achieves full displacement over a longer period time as compared to the ideal response, the model response is the curve or basis against which the actual measured displacement response 506 is compared. While many variables can be compared between the two, a couple of basic examples are easily demonstrated. First, if the time gap 508 between the modeled beginning of displacement and the actual beginning of displacement is too large (such as beyond a predetermined acceptable range of variance from the modeled response), the system may flag the physical component as having reduced performance. In response, the system may initiate movement earlier than normal and/or may simply flag the component for repair. Similarly, if a difference 510 in the actual measured rate of displacement (or acceleration or jerk if measured) and the simulated rate of displacement is too great (as compared to a predetermined acceptable range of variance), the system may flag the physical component as having a reduced performance. In response, the system may adjust an applied power (or adjust a slew value) or otherwise compensate to achieve a faster rate of actual measured displacement and/or may simply flag the component for repair. In some cases, the system may output an audible or visual alert regarding a status of the physical component as a function of the comparison results. The system may also reconfigure by disengaging performance affected components and engaging redundant components, if available, to subsequently maintain aircraft function.

In the least, the systems and methods disclosed herein are novel insofar as they provide a uniform model designed for monitoring reduction of performance margins related to airplane surface and active RPM control for a commercial passenger-carrying hybrid electric multirotor tilting ducted fan aerial vehicle (such as aircraft 100) capable of wingborne flight and equipped with duct vanes, differential RPM control, flaps/flaperons and/or elevators, and with a gross weight above 4000 lbs. The model can comprise per-monitor tunable delay and/or tunable slew-limiting functions to enable early detection of maintenance issues At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A reduced performance monitoring system, comprising:
   a physical component of an aircraft configured to physically displace over time relative to another component of the aircraft;
   a simulation component configured to generate a simulated displacement response of the physical component the simulated displacement response comprising a simulated displacement response delay in time; and
   a comparison module configured to compare a measured physical displacement response delay in time of the physical component to the simulated displacement response delay in time of the physical component to determine whether a time difference is within an acceptable range;
   wherein the physical component is a physical component configured to affect a flight operation of the aircraft during flight of the aircraft.

2. The system of claim 1, wherein the physical component comprises a rotor blade.

3. The system of claim 2, wherein the measured physical displacement response of the physical component is an angular displacement about a rotor axis.

4. The system of claim 2, wherein the measured physical displacement response of the physical component is an angular displacement about a pitch change axis.

5. The system of claim 1, wherein the physical component comprises an elevator of a wing.

6. The system of claim 1, wherein the physical component comprises a flap of a tail.

7. The system of claim 1, wherein a comparison of displacement is made by the comparison module.

8. The system of claim 1, wherein a comparison of a velocity is made by the comparison module.

9. The system of claim 1, wherein a comparison of acceleration is made by the comparison module.

10. The system of claim 1, wherein a comparison of jerk is made by the comparison module.

11. A method of monitoring a physical component for reduced performance, comprising:
    operating a physical component of an aircraft to displace relative to another component of the aircraft;
    generating a simulated response of the physical component, the simulated displacement response comprising a simulated response delay in time;
    measuring the displacement of the physical component; and
    comparing a measured displacement delay in time to the simulated response delay in time to determine whether a time difference is within an acceptable range;
    wherein the physical component is a physical component configured to affect a flight operation of the aircraft during flight of the aircraft.

12. The method of claim 11, wherein the physical component comprises a rotor blade.

13. The method of claim 12, wherein the measured physical displacement response of the physical component is an angular displacement about a rotor axis.

14. The method of claim 12, wherein the measured physical displacement response of the physical component is an angular displacement about a pitch change axis.

15. The method of claim 11, wherein the physical component comprises an elevator of a wing.

16. The method of claim 11, wherein the physical component comprises a flap of a tail.

17. The method of claim 11, wherein a comparison of displacement is made by the comparison module.

18. The method of claim 11, wherein a comparison of a velocity is made by the comparison module.

19. The method of claim 11, wherein a comparison of acceleration is made by the comparison module.

* * * * *